US009421535B2

(12) United States Patent
Tanaka et al.

(10) Patent No.: US 9,421,535 B2
(45) Date of Patent: Aug. 23, 2016

(54) EXHAUST GAS PURIFYING CATALYST

(75) Inventors: Toshiyuki Tanaka, Nisshin (JP); Tsuyoshi Hamaguchi, Nagoya (JP); Takanori Murasaki, Kariya (JP); Masao Watanabe, Susono (JP); Daichi Imai, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 872 days.

(21) Appl. No.: 13/259,500

(22) PCT Filed: Jun. 16, 2010

(86) PCT No.: PCT/IB2010/001515
§ 371 (c)(1),
(2), (4) Date: Sep. 23, 2011

(87) PCT Pub. No.: WO2010/146458
PCT Pub. Date: Dec. 23, 2010

(65) Prior Publication Data
US 2012/0094826 A1    Apr. 19, 2012

(30) Foreign Application Priority Data
Jun. 17, 2009    (JP) .................. 2009-144252

(51) Int. Cl.
*B01J 21/00* (2006.01)
*B01J 23/00* (2006.01)
(Continued)

(52) U.S. Cl.
CPC ........... *B01J 35/0073* (2013.01); *B01D 53/945* (2013.01); *B01J 23/34* (2013.01);
(Continued)

(58) Field of Classification Search
USPC ......... 502/304, 330–332, 325, 338, 345–348, 502/324, 336, 100, 300, 302
See application file for complete search history.

(56) References Cited

U.S. PATENT DOCUMENTS

2007/0155626 A1* 7/2007 Yasuda ................ B01D 53/945
502/329
2007/0197373 A1* 8/2007 Miura .................. B01D 53/945
502/100
(Continued)

FOREIGN PATENT DOCUMENTS

CN    101380578 A    3/2009
JP    10-258232 A    9/1998
(Continued)

OTHER PUBLICATIONS

Database WIP Week 200960, Thomson Scientific London, GB; AN 2009-G47359, XP002599545, Sep. 20, 2010.
International Search Report and Written Opinion for corresponding International Patent Application No. PCT/IB2010/001515 mailed Sep. 27, 2010.

*Primary Examiner* — James McDonough
(74) *Attorney, Agent, or Firm* — Sughrue Mion, PLLC

(57) ABSTRACT

An exhaust gas purifying catalyst includes: a support that contains at least one element that is selected from the first group that consists of Al, Zr and Ce, at least one element that is selected from the second group that consists of Ag, Mn, Co, Cu and Fe, and Ti; and particles that are composed of a metal or oxide of at least one element that is selected from the third group that consists of Ag, Mn, Co, Cu and Fe and that are deposited on the support. Seventy percent or more of any plurality of measurement points with a diameter of 2 nm on a surface of the support are composed of a composite part that has the at least one element selected from the second group content of 0.5 to 10 mol % and has a Ti content of 0.3 mol % or greater.

13 Claims, 4 Drawing Sheets

(51) Int. Cl.
*B01J 25/00* (2006.01)
*B01J 29/00* (2006.01)
*B01J 23/10* (2006.01)
*B01J 35/00* (2006.01)
*B01D 53/94* (2006.01)
*B01J 23/34* (2006.01)
*B01J 23/50* (2006.01)
*B01J 23/70* (2006.01)
*B01J 37/02* (2006.01)
*B01J 21/06* (2006.01)

(52) U.S. Cl.
CPC .............. *B01J 23/50* (2013.01); *B01J 23/70* (2013.01); *B01J 35/0006* (2013.01); *B01J 37/0203* (2013.01); *B01J 37/0242* (2013.01); *B01D 2255/104* (2013.01); *B01D 2255/2092* (2013.01); *B01D 2255/20707* (2013.01); *B01J 21/063* (2013.01); *B01J 21/066* (2013.01); *Y02T 10/22* (2013.01)

(56) References Cited

U.S. PATENT DOCUMENTS

| | | | |
|---|---|---|---|
| 2008/0124264 A1* | 5/2008 | Ikeda | B01J 23/44 423/213.5 |
| 2008/0279740 A1 | 11/2008 | Augustine et al. | |
| 2009/0048102 A1* | 2/2009 | Matsubara | B01D 53/945 502/304 |
| 2009/0124491 A1* | 5/2009 | Miura | B01D 53/945 502/304 |
| 2009/0239739 A1* | 9/2009 | Yasuda | B01D 53/9413 502/241 |

FOREIGN PATENT DOCUMENTS

| | | |
|---|---|---|
| JP | 11-057411 A | 3/1999 |
| JP | 11-076839 A | 3/1999 |
| JP | 11-169708 A | 6/1999 |
| JP | 2000-061310 A | 2/2000 |
| JP | 2008-178811 A | 8/2008 |
| WO | 2004/000454 A1 | 12/2003 |

* cited by examiner

EXHAUST GAS PURIFYING CATALYST

BACKGROUND OF THE INVENTION

1. Field of the Invention

The present invention relates to an exhaust gas purifying catalyst.

2. Description of the Related Art

To purify exhaust gas from internal combustion engines with low fuel consumption such as lean burn engines, studies on various exhaust gas purifying catalysts have been conducted. As one example of the exhaust gas purifying catalyst, a catalyst that has a support that contains silver is known. For example, Japanese Patent Application Publication No. 11-169708 (JP-A-11-169708) discloses a catalyst that contains at least one selected from platinum group metals such as Pt, Rh and Pd and at least one selected from the group that consists of Ti, Zr, Fe, Ni, Ag, Zn and Sn. Also, Japanese Patent Application Publication No. 11-76839 (JP-A-11-76839) discloses a catalyst that is composed of alumina and contains 4.5% by mass of silver and 1.1% by mass of titania. However, these catalysts do not have a satisfactory nitrogen oxide (NOx) adsorption capacity under low temperature conditions. Also, when the latter catalyst is poisoned by sulfur components, it is difficult to desorb the sulfur components from the catalyst and the temperature at which the sulfur components desorb therefrom is relatively high.

SUMMARY OF THE INVENTION

The present invention provides a exhaust gas purifying catalyst that has a sufficiently high NOx adsorption capacity under low temperature conditions and allows sulfur components to be desorbed from it after sulfur poisoning at a relatively low temperature.

A first aspect of the present invention relates to an exhaust gas purifying catalyst that includes: a support that contains at least one element that is selected from the first group that consists of Al, Zr and Ce, at least one element that is selected from the second group that consists of Ag, Mn, Co, Cu and Fe, and Ti; and particles that are composed of a metal or oxide of at least one element that is selected from the third group that consists of Ag, Mn, Co, Cu and Fe and that are deposited on the support. In this exhaust gas purifying catalyst, 70% or more of any plurality of measurement points with a diameter of 2 nm on a surface of the support are composed of a composite part that has the at least one element selected from the second group content of 0.5 to 10 mol % and has a Ti content of 0.3 mol % or greater.

In the exhaust gas purifying catalyst according to this aspect, the number of the plurality of measurement points may be 15 more.

In the exhaust gas purifying catalyst according to this aspect, the composite part may have the at least one element selected from the second group content of 1 to 7 mol % and the Ti content of 1 to 50 mol %.

Also, in the exhaust gas purifying catalyst according to this aspect, 80% or more of the any plurality of measurement points may be composed of the composite part.

In the exhaust gas purifying catalyst according to this aspect, the at least one element that is selected from the second group may be Ag.

In the exhaust gas purifying catalyst according to this aspect, the at least one element that is selected from the third group may be Ag.

In the exhaust gas purifying catalyst according to this aspect, the at least one element that is selected from the first group may be in the form of an oxide thereof.

In the exhaust gas purifying catalyst according to this aspect, content rates of the at least one element that is selected from the second group and the Ti, which the composite part has, may be measured by analyzing the plurality of measurement points by transmission electron microscopy-energy dispersive X-ray spectrometry.

In the exhaust gas purifying catalyst according to this aspect, the content rate of the at least one element that is selected from the first group may be 30 to 95% by mass based on the total mass of the exhaust gas purifying catalyst.

In the exhaust gas purifying catalyst according to this aspect, the content rate of the at least one element that is selected from the second group may be 5 to 50% by mass based on the total mass of the exhaust gas purifying catalyst.

In the exhaust gas purifying catalyst according to this aspect, the content rate of Ti that constitutes the support may be 1 to 50% by mass based on the total mass of the exhaust gas purifying catalyst.

A second aspect of the present invention relates to a method for production of an exhaust gas purifying catalyst that includes: contacting a porous material that is composed of at least one element that is selected from a group that consists of Al, Zr and Ce with a solution that contains at least one element that is selected from a group that consists of Ag, Mn, Co, Cu and Fe; calcining the porous material, which has been contacted with the solution, to obtain a support on which the at least one element that is selected from the group that consists of Ag, Mn, Co, Cu and Fe is deposited; contacting the support with a solution that contains a complex in which a multidentate ligand coordinates to Ti; and calcining the support contacted with the solution that contains the complex.

In the production method according to this aspect, temperature for calcining the support contacted with the solution that contains the complex may be 300° C. to 700° C., and time that is necessary to calcine the support contacted with the solution that contains the complex may be 3 to 10 hours.

In the production method according to this aspect, the multidentate ligand may be a residue that is formed by removing at least one hydrogen from one residue that is selected from the group that consists of: polyhydric carboxylic acids; diol groups; diamine groups; and ester groups that have two carbonyl groups.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
FIG. 1 is a transmission electron microscope (TEM) photograph of a surface of the support of the exhaust gas purifying catalyst that was obtained in Example 1.

The present inventors found that it is possible to achieve a sufficiently high NOx adsorption capacity under low temperature conditions and to desorb sulfur components from a catalyst after sulfur poisoning at a relatively low temperature when the catalyst includes a support that contains at least one element (a) that is selected from the group that consists of Al, Zr and Ce and at least one element (b) that is selected from the group that consists of Ag, Mn, Co, Cu and Fe, and particles that are composed of a metal or oxide of at least one element (c) that is selected from the group that consists of Ag, Mn, Co, Cu and Fe and that are deposited on the support and when the support has composite parts, as described below, at a specific rate that contain Ti and the element (b), and have achieved the present invention.

Description is hereinafter made of an embodiment of the present invention in detail.

An exhaust gas purifying catalyst according to this embodiment includes a support that contains at least one element (a) that is selected from the group that consists of Al (aluminum), Zr (zirconium) and Ce (cerium), at least one element (b) that is selected from the group that consists of Ag (silver), Mn (manganese), Co (cobalt), Cu (copper) and Fe(iron), and Ti; and particles that are composed of a metal or oxide of at least one element (c) that is selected from the group that consists of Ag, Mn, Co, Cu and Fe and that are deposited on the support. In this catalyst, when any plural number of measurement points with a diameter of 2 nm on a surface of the support are analyzed by transmission electron microscopy-energy dispersive X-ray spectrometry (TEM-EDX), a composite part that is composed of Ti and the element (b) and that satisfies the condition that the content of the element (b) is 0.5 to 10 mol % and the content of Ti is 0.3 mol % or greater is observed in 70% or more of all the measurement points.

The support according to this embodiment contains at least one element (a) that is selected from the group that consists of Al, Zr and Ce. The element (a) in the support is not specifically limited, and may be in the form of an oxide. Also, the support may contain the element (a) as a porous material that is composed of alumina, zirconia, ceria or a composite oxide thereof. Such porous materials may be used singly or in combination of two or more.

In addition, the form of the porous material that contains the element (a) is not specifically limited, and the porous material may be in the form of a powder from the viewpoint of an increase in specific surface area and improvement in catalytic activity. When the porous material is in the form of a powder, the average particle size of the porous material is not specifically limited and may be 0.1 to 50 μm, more specifically 1 to 30 μm. When the particle size is below 0.1 μm, the porous material requires much cost for refinement and tends to be difficult to handle. On the other hand, when the particle size is over 50 μm, it is difficult to form a coat layer stably on a substrate, which is described later.

The porous material may have a specific surface area of 20 $m^2/g$ or greater, more specifically 50 to 300 $m^2/g$. When the specific surface area is below 20 $m^2/g$, it tends to be difficult to deposit particles that are composed of the element (c) on the porous material. On the other hand, when specific surface area is over 300 $m^2/g$, the porous material undergoes a significant decrease in specific surface area that is caused by thermal degradation. The specific surface area can be calculated as a BET specific surface area from an adsorption isotherm using a BET adsorption isotherm equation.

The method for producing the porous material is not specifically limited, and any conventionally known method may be employed as needed. For example, when a porous material that is composed of a composite oxide as described above is produced, a method for producing a porous material by forming, from an aqueous solution that contains at least two elements (a), a coprecipitate of the elements (a) in the presence of ammonia, filtering, washing and drying the resulting coprecipitate, and calcining the dried product may be employed. The porous material that contains the element (a) is not specifically limited and commercial products may be used.

The support also contains, in addition to the element (a), at least one element (b) that is selected from the group that consists of Ag, Mn, Co, Cu and Fe, and Ti. The element (b) may be preferably Ag, Mn, Co, or a combination thereof, more preferably Ag, for improved NO oxidation ability.

In the support, when any plural number of measurement points with a diameter of 2 nm on a surface of the support are analyzed by TEM-EDX, a composite part that is composed of Ti and the element (b) and that satisfies the condition that the content of the element (b) is 0.5 to 10 mol % and the content of Ti is 0.3 mol % or greater is observed in 70% or more of all the measurement points. The plurality of measurement points may consist of 15 or more points. When the content of the element (b) in the composite parts is below the lower limit, the number of NO adsorption sites is so small that the NOx adsorption amount decreases. On the other hand, when the content is over the upper limit, the NOx adsorption ability decreases because of a decrease in the degree of dispersion of the element (b) and the ability to desorb poisoning sulfur (S) components. (S-desorption ability) decreases because of a decrease in the rate of compounding with Ti. Also, when the content of Ti in the composite parts is below the lower limit, the S-desorption ability-improving effect is insufficient. Also, when the percentage of the measurement points in which the composite part is observed is less than 70% of all the measurement points, the abundance ratio of the composite parts in the support is so low that it is difficult to obtain a sufficiently high NOx adsorption capacity in a low temperature range.

As the method for the TEM-EDX analysis, the following method is employed. First, using a measurement device for TEM-EDX analysis, the energy dispersive X-ray fluorescence spectra in an arbitrary measurement point with a diameter of 2 nm on a surface of the support are obtained. Then, the area of the peak that is derived from the element (a), the area of the peak that is derived from the element (b), and the area of the peak that is derived from Ti are obtained from the obtained energy dispersive X-ray fluorescence spectra, and the content (mol %) of each element in the measurement point is obtained from the ratio of the peak areas (area ratio). The term "peak" here refers to a peak that has an intensity difference of the height from the baseline of the spectra to the peak top that is equal to or greater than 1 cps. Also, the term "peak area" refers to the area between the baseline and peak, and it may be obtained using commercially available software (such as "Origin," trade name, manufactured by OriginLab). Also, the content ratio of the elements that is obtained as described above is obtained in any plurality number (preferably 15 or more) of measurement points. The measurement device for TEM-EDX analysis is not specifically limited, and a TEM-EDX apparatus that is obtained by combining a conventionally known transmission electron microscope (TEM) with a conventionally known energy dispersive X-ray spectrometer (EDX analyzer) (such as "JEM-2010FES," trade name, manufactured by JEOL Ltd.) may be used.

The composite parts are areas where the element (b) and Ti are present in a mixed state at the above-mentioned ratio in a minute region with a diameter of 2 nm. Thus, in the composite parts, the element (b) and Ti are present in a state in which they are finely mixed (preferably, in a state in which particles of the element (b) with an average particle size of 1 nm or smaller and Ti particles with an average particle size of 1 nm or smaller are mixed, more preferably, in a state in which the element (b) and Ti are mixed at the atomic level).

In the support according to this embodiment, the composite part that is composed of Ti and the element (b) and that satisfies the condition that the content of the element (b) is 1 to 7 mol % and the content of Ti is 1 to 50 mol % may be observed in 70% or more of all the measurement points by the TEM-EDX analysis in order to achieve a good balance between the NOx adsorption capacity and the S-desorption ability.

In addition, in the support, the composite part may be observed in 80 to 100% (more preferably, 90 to 100%) of all the measurement points by the TEM-EDX analysis. As the proportion of the measurement points where the composite part is observed increases, a higher NOx adsorption capacity and a better ability to recover from S-poisoning can be obtained.

In addition, in the support, the composite parts that are composed of the element (b) and Ti may be formed in the regions in the vicinity of surfaces of the porous material that contains the element (a). That is, the support may include the porous material, and composite parts that are composed of the element (b) and Ti and that are formed in regions in the vicinity of surfaces of the porous material. The regions in the vicinity of surfaces here are not specifically limited, and may refer to the regions from surfaces of the support to the depth of about 50 nm in the direction perpendicular to the surfaces.

In the exhaust gas purifying catalyst according to this embodiment, particles that are composed of a metal or oxide of at least one element (c) that is selected from the group that consists of Ag, Mn, Co, Cu and Fe are deposited on the support.

The element (c) that is is contained in the particles may be selected from Ag, Mn and Co or may be Ag from the viewpoint of NO oxidation ability. Also, the particles that are composed of a metal or oxide of the element (c) may be substantially free of elements other than the element (c), and may contain 10 mol % or less of other elements. The elements (C) may be used singly or in combination of two or more.

The particles that are composed of a metal or oxide of the element (c) may have a diameter over 1 nm. The average diameter of the particles with a diameter over 1 nm that are composed of a metal or oxide of the element (c) and that are deposited on the support may be 2 to 30 nm, or may be 5 to 10 nm. When the average diameter of the particles is below the lower limit, the NO oxidation ability tends to decrease. On the other hand, when the average diameter is over the upper limit, active sites for NO oxidation decreases. The average diameter of the particles can be obtained by measuring the diameters of 15 or more of particles with a diameter over 1 nm by TEM observation and calculating the average of the diameters. The diameter refers to the maximum diameter in cross-section of each particle, and, when the cross-section of a particle is not circular, the diameter refers to the diameter of the maximum circumscribed circle thereof.

The content of the element (a) in the exhaust gas purifying catalyst may be 30 to 95% by mass, or may be 50 to 90% by mass. When the content of the element (a) is below the lower limit, it tends to be impossible to obtain a sufficient specific surface area to disperse the element (b) and the element (c). On the other hand, when the content is over the upper limit, the amounts of the elements (b) and (c) that serve as active components for NOx adsorption is insufficient.

In addition, the total content of the elements (b) and (c) in the entire exhaust gas purifying catalyst may be 5 to 50% by mass, or may be 10 to 40% by mass. When the total content of the elements (b) and (c) is below the lower limit, it tends to be impossible to obtain sufficient catalytic activity because of an insufficiency in the number of NOx adsorption sites that are composed of the element (b) and insufficient formation of the particles that are composed of a metal or oxide of the element (c) on the support. On the other hand, when the total content is over the upper limit, the specific surface area is reduced by pore blockage or other reasons and the number of active sites decreases.

The content of Ti in the exhaust gas purifying catalyst may be 1 to 50% by mass, or may be 3 to 30% by mass. When the Ti content is below the lower limit, the abundance ratio of the composite parts that satisfies the above condition tends to decrease. On the other hand, when the Ti content is over the upper limit, a decrease in specific surface area and a decrease in thermal resistance cause a decrease in abundance of the composite parts.

The content of the element (a), the total content of the elements (b) and (c), and the Ti content are calculated from the weights of oxides that are formed by oxidization of each element.

The form of the exhaust gas purifying catalyst according to this embodiment is not specifically limited. The exhaust gas purifying catalyst may be in the form of a monolith catalyst with a honeycomb shape, or in the form of a pellet catalyst with a pellet shape. The substrate for use here is not specifically limited and is suitably selected depending on the usage and so on of the resulting catalyst. A DPF substrate, monolith-type substrate, pellet-type substrate, or plate-type substrate may be employed. Also, the material of the substrate is not specifically limited, and a substrate that is made of ceramics such as cordierite, silicon carbide or mullite, or a substrate that is made of a metal such as stainless steel that contains chromium or aluminum may be employed. In addition, the method for producing a catalyst in the case where such a substrate is used is not specifically limited. For example, a method that includes depositing a support on a monolith-type substrate to form a coat layer that is composed of a support powder, depositing the metal particles on the coat layer, and depositing the third metal on the coat layer, or a method that includes depositing a support on which the metal particles have been deposited on a monolith-type substrate to form a coat layer, and depositing the third metal on the coat layer may be employed, When the exhaust gas purifying catalyst is deposited on a substrate, the amount of the element (a) that is deposited per liter of the of substrate volume may be 50 to 300 g/L, and may be preferably 100 to 250 g/L, in terms of metal oxides. When the amount of the element (a) that is deposited is below the lower limit, it tends to be impossible to obtain a sufficient catalytic activity. On the other hand, when the amount is over the upper limit; it causes an increase in pressure loss or peeling of the coat layer.

In addition, when the exhaust gas purifying catalyst is deposited on a substrate, the total amount of the elements (b) and (c) that are deposited per liter of the substrate volume may be 0.1 to 1.0 mol/L, and may be preferably 0.2 to 0.6 mol/L, in terms of metals. When the total amount of the elements (b) and (c) that are deposited is below the lower limit, it tends to be impossible to obtain sufficient catalytic activity because of an insufficiency in the number of NOx adsorption sites that are composed of the element (b) and insufficient formation of the particles that are composed of a metal or oxide of the element (c) on the support. On the other hand, when the total amount is over the upper limit, the specific surface area is reduced by pore blockage or other reasons and the number of active sites decreases.

In addition, when the exhaust gas purifying catalyst is deposited on a substrate, the amount of Ti that is deposited per liter of substrate volume may be 0.03 to 3 mol/L, may be preferably 0.1 to 1 mol/L, in terms of the metal. When the amount of Ti that is deposited is below the lower limit, the composite parts are not sufficiently formed and the catalytic activity tends to decrease. On the other hand, when the amount is over the upper limit, the abundance of the composite parts decreases because of a decrease in specific surface area.

The present inventors infer the reasons why the exhaust gas purifying catalyst according to this embodiment can have a sufficiently high NOx adsorption capacity even under low temperature conditions (preferably under a temperature condition of 200° C. or lower) and sulfur components can be desorbed from the catalyst after sulfur poisoning at a relatively low temperature as follows. First, in this embodiment, the composite parts as described above are formed in the support. The composite parts are areas where the element (b) and Ti are present in a mixed state at the above-mentioned ratio in very minute regions with a diameter of 2 nm in the support. Because, in the composite parts, the element (b) and Ti are observed to be present in a mixed state at the above-mentioned ratio in a minute regions as described above, at least the element (b) and Ti are mixed in a fine state (preferably in a state in which particles of each element are present with an average particle size of 1 nm or smaller, more preferably in a state the elements are mixed at the atomic level) in the regions. It is inferred that in the composite parts where the element (b) and Ti are finely mixed, the element (b), which is effective in adsorbing NOx, is sufficiently highly dispersed when NOx is adsorbed and exhibits a high NOx adsorption amount. It is also believed that the composite parts are formed on the surfaces of the support at a sufficiently high rate if the composite part is observed in 70% or more of the measurement points when any plural number of measurement points on the support are subjected to the measurement. Thus, when the abundance ratio of the composite parts is high, a large number of sites with a high degree of dispersion that are effective in adsorbing NOx can be present on the surfaces. Also, because NO is oxidized to $NO_2$, which is adsorbed more easily, by the particles that are composed of the element (c) and deposited on the support and then adsorbed as nitrates and nitrites onto the composite parts that are formed in the support, a sufficiently high NOx adsorption capacity can be achieved. The present inventors also infer that because the composite parts on the support can reduce the stability of poisoning sulfur that serves as a hindrance to adsorption of NOx, it is possible to desorb SOx from the exhaust gas purifying catalyst according to this embodiment at a sufficient desorption rate at a relatively low temperature.

A method for the production of an exhaust gas purifying catalyst according to this embodiment is next described. One example of the method for the production of an exhaust gas purifying catalyst includes a first process that includes contacting a porous material as described above with a solution that contains a compound of at least one element (i) that is selected from the group that consists of Ag, Mn, Co, Cu and Fe and then calcining the porous material to obtain a support on which the element (i) is deposited (element support), and a second process that includes contacting the element support with a solution that contains a complex that contains Ti and a multidentate ligand and then calcining the element support to form composite parts that are composed of Ti and the element (i) in the vicinity of surfaces of the porous material, thereby obtaining a catalyst. In the catalyst that is obtained as described above, a portion of the element (i) that is deposited on the porous material in the first process forms the composite parts in conjunction with Ti in the second process and thereby turns into a component that constitutes part of the support (element (b)), and the remaining portion of the element (i) turns into particles that are deposited on the support (particles composed of a metal or oxide of the element (c)). That is, when a method that includes the first and second processes as described above is employed, a portion of the element (i) that is deposited in the first process, in other words, the portion that does not form the composite parts (composite compounds) in conjunction with Ti and remains as particles (basically, particles with a diameter over 1 nm) of the element (i) in the second process, turns into particles that are composed of a metal or oxide of the element (c) and deposited on the support. Thus, when a method that includes the first and second processes as described above is employed, a catalyst that includes a support that contains at least one element (a) that is selected from the group that consists of Al Zr and Ce, at least one element (b) that is selected from the group that consists of Ag, Mn, Co, Cu and Fe, and Ti; and particles that are composed of a metal or oxide of at least one element (c) that is selected from the group that consists of Ag, Mn, Co, Cu and Fe and that are deposited on the support can be produced efficiently.

In the method that includes the first and second processes as described above, the porous material is first contacted with a solution that contains a compound of at least one element (i) that is selected from the group that consists of Ag, Mn, Co, Cu and Fe and then calcined to obtain a support on which the element (i) is deposited (element support) (first process).

The element (i) that is used in the process is the same as the element (b) or the element (c). Also, the compound of the element (i) may be any compound as long as it allows the element (i) to be deposited on the porous material, and examples of usable compounds include, but are not specifically limited to, salts (such as nitrates, acetates and carbonates) of the element (i), complexes (such as dinitrodiammine complex) of the element (i), and hydroxides of the element (i).

The solvent that is used to prepare the solution that contains a compound of the element (i) not specifically limited, and may be a solvent that allows the element (i) to dissolve in the form of ions such as water. The concentration of the compound of the element (i) in the solution may be 5 mol/L or lower, or may be 0.3 to 2 mol/L. When the concentration is over the upper limit, it is difficult to deposit the element (i) on the support in a uniformly and finely dispersed state and the number of the measurement points where the composite part is observed will be less than 70% of all the measurement points when the TEM-EDX analysis is performed on the resulting support. When the concentration is below the lower limit, a plurality of processes is required to deposit a prescribed amount of the element (i) and the working efficiency decreases. In addition, because re-elution and precipitation occur and the degree of dispersion decreases during the plurality of deposition processes, the number of the measurement points where the composite part is observed will be less than 70% of all the measurement points when the TEM-EDX analysis is performed on the resulting support.

The method for contacting the porous material with the solution is not specifically limited, and any conventionally known method by which the solution is deposited on the porous material by adsorption, such as a method in which the porous material is immersed into the solution and stirred, may be employed. Also, when the porous material is contacted with the solution, the solution may be contacted such that the amount of the element (i) deposit on the resulting element support will be 5 to 30% by mass (more preferably 10 to 20% by mass). When the amount of the the element (i) deposit is below the lower limit, it is difficult to form the composite parts sufficiently and the number of the measurement points where the composite part is observed tends to be below 70%. On the other hand, when the amount is over the upper limit, the specific surface area is reduced by pore blockage or other reasons, which causes a decrease in the number of active sites.

In addition, the calcination temperature after the solution is adsorbed to the porous material may be 300 to 700° C., or may be 400 to 600° C., and the calcination time may be 3 to 10 hours, or may be 4 to 6 hours. When the calcination temperature and time are below the lower limits, the deposited salt is not decomposed, resulting in unsatisfactory performance. On The other hand, when the calcination temperature and time are over the upper limits, thermal degradation progresses, which causes a decrease in the degree of dispersion of the elements (b) and (c).

According to the first process, it is possible to obtain an element support in which fine particles (more preferably 1 nm or smaller) of a metal or oxide of the element (i) are sufficiently deposited on surfaces of the porous material.

Next, the element support that is obtained in the first process is contacted with a solution that contains a complex that contains Ti and a multidentate ligand, and the element support is then calcined to form the composite parts that are composed of Ti and the element (i) in the vicinity of surfaces of the porous material, there by obtaining a catalyst (second process).

The multidentate ligand in the complex refer to a ligand that can coordinate to Ti with two or more coordinating groups. Examples of the multidentate ligand include residues that are formed by removing at least one hydrogen from polyhydric carboxylic acids such as citric acid and oxalic acid, residues that are formed by removing at least one hydrogen from diols such as glycol and pinacol, residues that are formed by removing at least one hydrogen from diamines such as ethylenediamine, and residues that are formed by removing at least one hydrogen from esters that has two carbonyl groups such as ethyl acetoacetate. The multidentate ligand may be a residue that is formed by removing at least one hydrogen from at least one of citric acid, oxalic acid, succinic acid, maleic acid, malic acid, adipic acid, tartaric acid, malonic acid, fumaric acid, aconitic acid, glutaric acid, ethylenediaminetetraacetic acid, lactic acid, glycolic acid, glyceric acid, salicylic acid, mevalonic acid, ethylenediamine, ethyl acetoacetate, malonic acid ester, glycol and pinacol. Above all, the multidentate ligand may be a residue that is formed by removing at least one hydrogen from at least one of citric acid, lactic acid, malic acid, tartaric acid, glycolic acid and salicylic acid, which are carboxylic acids that also have a hydroxy group, or may be a residue that is formed by removing at least one hydrogen from at least one of citric acid and malic acid for the reason that it enables Ti to be deposited as finer particles and to form fine composite (to be mixed at the nano-level) with the element (i) more efficiently. Such multidentate ligands may be used singly or in combination of two or more.

The method for preparing the complex that contains Ti and a multidentate ligand (a Ti complex in which a multidentate ligand coordinates to Ti) is not specifically limited, and any conventionally known method can be employed as needed. For example, a method for obtaining a complex that contains Ti and a multidentate ligand by adding and dissolving a titanium compound such as titanium isopropoxide (which may be a commercial product) into an aqueous solution that contains an ingredient of the multidentate ligand such as citric acid, lactic acid or malic acid may be employed. The reaction conditions to obtain the complex are not specifically limited, and may be changed to a suitable temperature and so on as needed based on the type of the ingredient of the multidentate ligand that is used.

In addition, the solvent for the solution that contains the complex may be water (more preferably, pure water such as ion-exchanged water or distilled water). Also, the concentration of the complex in the solution that contains the complex may be 0.1 to 3 mol/L, may be preferably 0.3 to 2 mol/L. When the concentration is over the upper limit, the viscosity of the solution increases, making it difficult to deposit the solution on the porous support with a high degree of dispersion. When the concentration is below the lower limit, the number of deposition processes to obtain a prescribed amount of deposit increases and the working efficiency decreases. By using a solution that contain a complex as described above, it is possible to form a composite part that is composed of Ti and the element (b) and that satisfies the condition that the content of the element (b) is 0.5 to 10 mol % and the Ti content is 0.3 mol % or greater according to the TEM-EDX analysis in 70% or more of all the measurement points more efficiently.

The method for contacting the element support with the solution that contains the complex is not specifically limited, and any conventionally known method by which the solution is deposited on the element support by adsorption, such as a method in which the element support is immersed into the solution and stirred, can be employed as needed. Also, when the element support is contacted with the solution that contains the complex, the element support may be contacted with the solution such that the amount of Ti deposit on the resulting catalyst will be 1 to 50% by mass (more preferably 3 to 30% by mass). When the amount of Ti deposit is below the lower limit, the number of the composite parts that are composed of the element (b) and Ti decreases and the number of NOx adsorption sites that has a high S-desorption ability tends to decrease. On the other hand, when the amount of Ti deposit is over the upper limit, the abundance of the composite with the element (b) decreases because of a decrease in specific surface area and a decrease in thermal resistance.

The conditions for the calcination after the element support is contacted with the solution may include a calcination temperature of 300 to 700° C. (more preferably 400 to 600° C.) and a calcination time of 3 to 10 hours (more preferably 4 to 6 hours) for reasons of ensuring more reliable formation of the composite parts at the above-mentioned rate. When the calcination temperature and time are below the lower limits, the deposited salt is not decomposed, resulting in unsatisfactory performance. On the other hand, when the calcination temperature and time are over the upper limit, the abundance of the composite parts that are composed of Ti and the element (b) decreases because of a decrease in specific surface area caused by thermal degradation or other reasons.

The present inventors infer the reason why the composite part can be formed in 70% or more of any plural number of all the measurement points (preferably 15 or more points) with a diameter of 2 nm on a surface of the support by the first and second processes as follows. First, by depositing 5 wt % or more of the element (i) on the porous material in the first process, it is possible to allow a sufficient amount of the element (i) to be present on the surfaces thereof. Thus, the element (i) in the element support that is obtained by this process is deposited on the porous material in a highly dispersed state. When a complex that contains Ti and the multidentate ligand is deposited on the element support by contacting the element support in which the element (i) is in a highly dispersed state with a solution that contains the complex, the nucleus (Ti) in each complex is placed on the element support separately from other nuclei because of the presence of the ligand. In other, words, because of the presence of the multidentate ligand, a state in which the nucleus (Ti) of each complex is dispersively placed in an island fashion on the surfaces of the element support is created. Then, when the element support on which the complex is deposited is calcined, the Ti is deposited on the element support in an atomic state with its sufficiently dispersed state maintained because the atoms (Ti atoms) as nuclei of the complex is sufficiently prevented from aggregating when the ligands are removed because of the high thermal stability of the bond between the element support and the complex. On the other hand, in the element support, because the element (i) is deposited in a sufficiently highly dispersed state, the element (i) and Ti maintain the sufficiently dispersed state in the surface of the element support even when they are compounded by the calcination step. The present inventors therefore infer that, according to a method that includes the above first and second processes, it is possible to efficiently form a support in which a composite part that is composed of Ti and the element (b) and that satisfies the condition that the content of the element (b) is 0.5 to 10 mol % and the Ti content is 0.3 mol % or greater is observed in 70% or more of all the measurement points when any plural number (preferably 15 or more) of measurement points with a diameter of 2 nm on a surface thereof are analyzed by TEM-EDX. The present inventors also infer that because a portion of the particles of the element (i) in the element support aggregate to form particles composed of a metal or oxide of the element (c) (preferably particles with an average diameter of over 1 nm) during the calcination process that is employed in the second process, the exhaust gas purifying catalyst according to this embodiment can be produced efficiently. In the method that includes the first and second processes, because the porous material is calcined after a compound or complex of the element (i) is deposited on surfaces of the porous material to form composite parts that are composed of the element (i) and Ti in the surfaces of the porous material, the composite parts are formed in regions in the vicinity of the surfaces of the support (preferably, in regions from the surfaces of the support to a depth of about 50 nm in the direction perpendicular to the surfaces).

Also, in the method that includes the first and second processes, a process, that includes contacting the support with a solution that contains a compound of the element (c) and then calcining the support to deposit particles that are composed of a metal or oxide of the element (c) on the support, may be carried out after the second process for reasons of ensuring more reliable deposition of the particles that are composed of a metal or oxide of the element (c) on the support.

As the method for the production of an exhaust gas purifying catalyst according to this embodiment, the following method can be employed in addition to the method that includes the first and second processes as described above. That is, a method for obtaining an exhaust gas purifying catalyst by contacting an element support that is obtained in the same manner as in the first process as described above with a complex solution that contains a compound of the element (i) and a complex that contains Ti and a multidentate ligand and then calcining the element support may be employed.

In the method that uses such a complex solution, the amount of the element (i) that is deposited on the element support that is obtained in the same manner as in the first process as described above may be 5 to 30% by mass, or may be 10 to 20% by mass. When the amount of deposit is below the lower limit, the content ratio of the particles that are composed of a metal or oxide of the element (c) in the resulting catalyst tends to be so small that a sufficient catalytic activity cannot be obtained. On the other hand, when the amount of deposit is over the upper limit, the specific surface area is reduced by pore blockage or other reasons and number of active sites that are composed of the elements (b) and (c) decreases.

As the solvent for the complex solution, the same solvent for the solution that contains a compound of the element (i) as described above can be used. Also, as the compound of the element (i) that is contained in the complex solution, the use of a complex of the element (i) (such as a carboxylic acid complex) is preferred for the reason that the element (i) can be deposited in a sufficiently dispersed state because of the presence of the ligand and the composite parts can be therefore formed more efficiently.

The content of the compound of the element (i) in the complex solution may be 0.1 to 3 mol/L (more preferably 0.3 to 2 mol/L). When the content of the compound of the element (i) is below the lower limit, a plurality of processes is required to deposit a prescribed amount of the element (i) and the working efficiency tends to decrease. On the other hand, when the amount is over the upper limit, an increase in viscosity of the solution makes uniform deposition difficult.

In addition, the content of the complex that contains Ti and a multidentate ligand in the complex solution may be 0.1 to 3 mol/L (more preferably 0.3 to 2 mol/L), and the ratio (molar ratio) between the complex that contains Ti and a multidentate ligand and the element (i) may be 1:3 to 3:1. When the content of the complex is below the lower limit, a sufficient effect cannot be obtained in compounding with the element (b). On the other hand, when the content is over the upper limit, unnecessary Ti increases in the surfaces on which the composite parts are formed because of the presence of excess Ti relative to the element (i).

The calcination conditions in the method that uses such a complex solution may be the same as the calcination conditions that are employed in the second process.

The exhaust gas purifying catalyst according to this embodiment that is obtained as described above is especially useful as a catalyst that is used to purify the exhaust gas from an internal combustion engine of a motorcar and so on. Also, the exhaust gas purifying catalyst may be used in combination with another catalyst. The other catalyst is not specifically limited, and any conventionally known catalyst can be used as needed. A what is called NOx reduction catalyst (such as $NH_3$—SCR catalyst) may be used. When used in combination with another catalyst as described above, the exhaust gas purifying catalyst according to this embodiment may be placed on the upstream side in a gas passage with the other catalyst placed downstream thereof so that the exhaust gas contacts the other catalyst after contacting the exhaust gas purifying catalyst according to this embodiment. By using the exhaust gas purifying catalyst according to this embodiment in combination with another catalyst as described above, NOx can be purified to a high level because NOx can be absorbed and removed by the exhaust gas purifying catalyst according to this embodiment on the upstream side when the exhaust gas temperature is low (about 200° C. or lower) and can be purified primarily by the other catalyst on the downstream side when the exhaust gas temperature is high.

This embodiment is described in further detail below based on examples and comparative examples.

Preparation Example 1 is described below. A hexagonal-cell cordierite monolith substrate (cell density: 400 cells/inch$^2$) with a diameter of 30 mm and a length of 50 mm was coated with an alumina powder (average particle size: 22 μm, "M1386," trade name, manufactured by W.R. Grace & Co.) by a wash-coat method such that the amount of coating per liter of the monolith substrate would be 200 g/L, thereby preparing a catalyst precursor (A).

Preparation Example 2 is described below. A hexagonal-cell cordierite monolith substrate (cell density: 400 cells/inch$^2$) with a diameter of 30 mm and a length of 50 mm was coated with a silica powder (average particle size: 12 nm, "AEROSIL200," trade name, manufactured by Nippon Aerosil Co., Ltd.) by a wash-coat method such that the amount of coating per liter of the monolith substrate would be 200 g/L, thereby preparing a catalyst precursor (B).

Preparation Example 3 is described below. A hexagonal-cell cordierite monolith substrate (cell density: 400 cell/inch) with a diameter of 30 mm and a length of 50 mm was coated with an alumina powder (average particle size: 22 μm, "M1386," trade name, manufactured by W.R. Grace & Co.) and with a titania ($TiO_2$) sol (average particle size of titania particles in the sol: 10 nm, "Tynoc," trade name, manufactured by Taki Chemical Co., Ltd.) by a wash-coat method such that the amount of alumina coating per liter of the monolith substrate would be 200 g/L and the amount of $TiO_2$ coating of per liter of the monolith substrate would be 0.1 mol/L in terms of the metal (Ti) to be deposited, thereby preparing a catalyst precursor (C).

Preparation Example 4 is described below. A hexagonal-cell cordierite monolith substrate (cell density: 400 cell/inch) with a diameter of 30 mm and a length of 50 mm was coated with a mixed powder that contained 120 g of a ceria-alumina powder (average particle size: 20 μm, Ce:Al (molar ratio in terms of metals): 1:20) that was prepared by a coprecipitation process using cerium nitrate and aluminum nitrate, 100 g of a titanic-zirconia composite oxide powder (average particle size: 20 μm, Ti:Zr (molar ratio in terms of metal): 1:1.5) that was prepared by a coprecipitation process using titanium tetrachloride and zirconium oxonitrate, and 50 g of zirconia powder (average particle size: 2 μm, "RC-100" trade name, manufactured by Daiichi Kigenso Kagaku Kogyo Co., Ltd.) on which 0.5 g of rhodium was deposited by a wash-coat method such that the amount of coating per liter of the monolith substrate was 270 g/L, thereby preparing a catalyst precursor (D).

Preparation Example 5 is described below. A silver nitrate aqueous solution was deposited on a catalyst precursor (A) that was obtained by the procedure as described in Preparation Example 1 by adsorption such that the amount of Ag deposit per liter of the monolith substrate would be 0.1 mol/L, and the catalyst precursor was then calcined at a temperature of 550° C. for 5 hours in the atmosphere, thereby preparing a catalyst precursor (E).

Preparation Example 6 is described below. A palladium nitrate aqueous solution was deposited on a catalyst precursor (A) that was obtained by the procedure as described in Preparation Example 1 by adsorption such that the amount of Pd deposit per liter of the monolith substrate would be 2 g/L, and catalyst precursor was then calcined at a temperature of 300° C. for 3 hours in the atmosphere, thereby preparing an NOx reduction catalyst.

Example 1 is described below. First, a silver nitrate aqueous solution was deposited on a catalyst precursor (A) that was obtained by the procedure as described in Preparation Example 1 by adsorption such that the amount of silver (Ag) deposit per liter of the monolith substrate would be 0.4 mol/L, and catalyst precursor was then calcined at a temperature of 550° C. for 5 hours in the atmosphere, thereby obtaining an Ag support in which Ag was deposited on the alumina in the catalyst precursor (A).

Next, 1.5 mol of citric acid was dissolved in 450 mL of ion exchanged water to prepare a citric acid solution. The citric acid solution was then heated to 75° C. and maintained at 75° C. Then, 0.3 mol of titanium isopropoxide was added and dissolved in the citric acid solution at the temperature and reacted for 5 hours. The reaction mixture was then cooled to room temperature (25° C.), thereby preparing a titanium citric acid complex aqueous solution (concentration of complex: 0.64 mol/L).

Then, the titanium citric acid complex aqueous solution was deposited on the Ag support by impregnation such that the amount of Ti deposit per liter of the monolith substrate would be 0.27 mol/L, and the catalyst precursor was then calcined at a temperature of 550° C. for 5 hours in the atmosphere, thereby obtaining an exhaust gas purifying catalyst.

Example 2 is described below. First, 3.3 mol (442 g) of malic acid was dissolved in a mixed solution of 374 mL of ion exchanged water and 445 mL of 28% by mass $NH_3$ aqueous solution to obtain a malic acid solution. The malic acid solution was then heated to 75° C. and maintained at 75° C. Then, 1.0 mol (299 g) of titanium isopropoxide was added and dissolved in the malic acid solution and reacted for 5 hours, and the reaction mixture was cooled to room temperature (25° C.) to prepare a titanium malic acid complex aqueous solution (0.9 mol/L). Then, 1.0 mol (167 g) of silver acetate was added to the titaniummalic acid complex aqueous solution, and 28% by mass $NH_3$ aqueous solution was also added to bring the pH of the solution to 8.5, thereby preparing a complex aqueous solution of silver acetate and titaniummalic acid complex.

Next, the complex aqueous solution was deposited on a catalyst precursor (E) that was obtained by the procedure as described in Preparation Example 5 by impregnation such that both the amounts of Ag and Ti deposits per liter of the monolith would be 0.1 mol/L in terms of metals, and the catalyst precursor was then calcined at a temperature of 550° C. for 5 hours in the atmosphere, thereby obtaining an exhaust gas purifying catalyst.

Comparative Example 1 is described below. A silver nitrate aqueous solution was deposited on a catalyst precursor (A) that was obtained by the procedure as described in Preparation Example 1 by adsorption such that the amount of Ag deposit per liter of the monolith substrate would be 0:4 mol/L, and the catalyst precursor was then calcined at a temperature of 550° C. for 5 hours in the atmosphere, thereby obtaining a catalyst for comparison.

Comparative Example 2 is described below. A silver nitrate aqueous solution was deposited on a catalyst precursor (A) that was obtained by the procedure as described in Preparation Example 1 by adsorption such that the amount of Ag deposit per liter of the monolith substrate would be 0.2 mol/L, and the catalyst precursor was then calcined at a temperature of 550° C. for 5 hours in the atmosphere, thereby obtaining a catalyst for comparison.

Comparative Example 3 is described below. A silver nitrate aqueous solution was deposited on a catalyst precursor (B) that was obtained by the procedure as described in Preparation Example 2 by adsorption such that the amount of Ag deposit per liter of the monolith substrate would be 0.2 mol/L, and the catalyst precursor was then calcined at a temperature of 550° C. for 5 hours in the atmosphere, thereby obtaining a catalyst for comparison.

Comparative Example 4 is described below. A silver nitrate aqueous solution was deposited on a catalyst precursor (C) that was obtained by the procedure as described in Preparation Example 3 by adsorption such that the amount of Ag deposit per liter of the monolith substrate would be 0.2 mol/L, and the catalyst precursor was then calcined at a temperature of 550° C. for 5 hours in the atmosphere, thereby obtaining a catalyst for comparison.

Comparative Example 5 is described below. A dinitrodiammine Pt nitric acid solution was deposited on a catalyst precursor (D) that was obtained by the procedure as described in Preparation Example 4 by adsorption such that the amount of Pt deposit per liter of the monolith substrate would be 2 g/L, and the catalyst precursor was then calcined at a temperature of 300° C. for 3 hours in the atmosphere, thereby preparing a Pt-supported catalyst.

Next, aqueous solutions of acetates of Ba, K and Li were deposited on the Pt-supported catalyst by impregnation such that the amounts of the metal element deposits per liter of the catalyst would Ba: 0.1 mol/L, K: 0.1 mol/L and Li: 0.2 mol/L, and the Pt-supported catalyst was then calcined at a temperature of 300° C. for 3 hours in the atmosphere, thereby preparing a catalyst for comparison.

Example 3 is described below. An exhaust gas purifying catalyst that was composed of a combination of two catalysts was prepared by placing an exhaust gas purifying catalyst that was obtained by the procedure as described in Example 1 on the upstream side and placing an NOx reduction catalyst that was obtained by the procedure as described in Preparation Example 6 on the downstream side of the exhaust gas purifying catalyst.

Comparative Example 6 is described below. A dinitrodiammine Pt nitric acid solution was deposited on a catalyst precursor (A) that was obtained by the procedure as described in Preparation Example 1 by adsorption such that the amount of Pt deposit per liter of the support would be 2 g/L, and the catalyst precursor was then calcined at a temperature of 300° C. for 3 hours in the atmosphere, thereby preparing a Pt-supported catalyst. Next, aqueous solutions of acetates of Ba, K and Li were deposited on the Pt-supported catalyst by impregnation such that the amounts of the metal element deposits per liter of the catalyst would be Ba: 0.2 mol/L, K: 0.15 mol/L and Li: 0.1 mol/L, and the Pt-supported catalyst was then calcined at a temperature of 300° C. for 3 hours in the atmosphere, thereby preparing an NOx storage and reduction catalyst.

The compositions of the catalysts that were obtained in Examples 1 to 2 and Comparative Examples 1 to 6 are shown in Table 1. In the following Table 1, the mixed powder contains 120 g of a ceria-alumina powder, 100 g of a titania-zirconia composite oxide powder, and 50 g of a zirconia powder on which 0.5 g of rhodium is deposited.

TABLE 1

|  | Metal oxide | | Amount of deposit | | | | | |
|---|---|---|---|---|---|---|---|---|
|  | Type of oxide | g/L | Ag mol/L | Ti mol/L | Pt g/L | Ba mol/L | K mol/L | Li mol/L |
| Example 1 | Alumina | 200 | 0.4 | 0.27 | — | — | — | — |
| Example 2 | Alumina | 200 | 0.2 | 0.1 | — | — | — | — |
| Comparative Example 1 | Alumina | 200 | 0.4 | — | — | — | — | — |
| Comparative Example 2 | Alumina | 200 | 0.2 | — | — | — | — | — |
| Comparative Example 3 | Silica | 200 | 0.2 | — | — | — | — | — |
| Comparative Example 4 | Alumina + Ti | 208 | 0.2 | 0.1 | — | — | — | — |
| Comparative Example 5 | Mixed powder* | 270 | — | — | 2 | 0.1 | 0.1 | 0.2 |
| Comparative Example 6 | Alumina | 200 | — | — | 2 | 0.2 | 0.15 | 0.1 |

As performance evaluation of the catalysts that were obtained in Examples 1 to 3 and Comparative Examples 1 to 6, TEM-EDX analysis was carried out in the same way as described above on the exhaust gas purifying catalysts that were obtained in Examples 1 to 2 and the catalyst that were obtained in Comparative Examples 3 to 4. For the TEM-EDX analysis, "JEM-2010FEF," trade name, manufactured by JEOL, was used as a measurement device. More than 15 measurement points on the support of each catalyst were subjected to measurement and analysis. In the EDX analysis, areas on the surface of the support where Ag particles with a particle size over 1 nm were not observed were subjected to the measurement.

Figure 2:
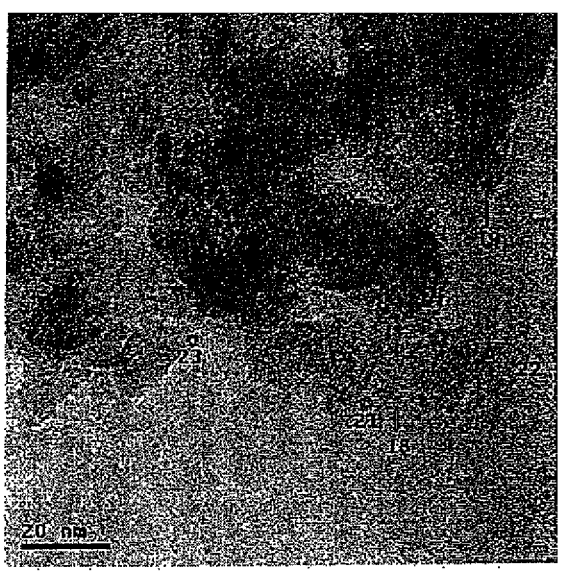
FIG. 2 is a transmission electron microscope (TEM) photograph of a surface of the support of the exhaust gas purifying catalyst that was obtained in Example 1.
Figure 3:
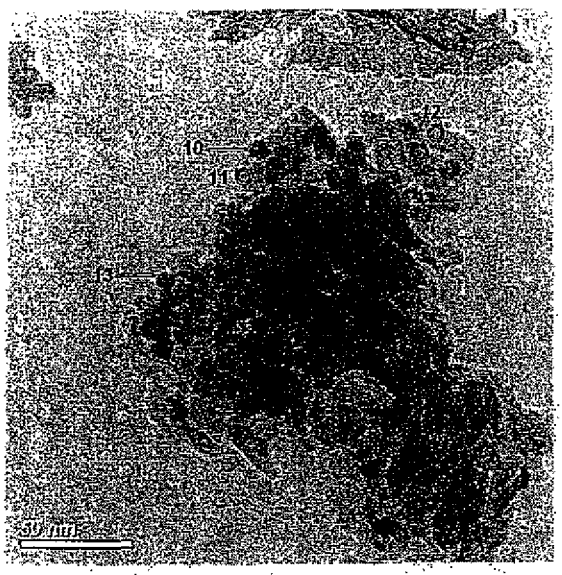
FIG. 3 is a transmission electron microscope (TEM) photograph of a surface of the support of the exhaust gas purifying catalyst that was obtained in Example 2.
Figure 4:
FIG. 4 is a transmission electron microscope (TEM) photograph of a surface of the support of the exhaust gas purifying catalyst that was obtained in Example 2.
Figure 5:
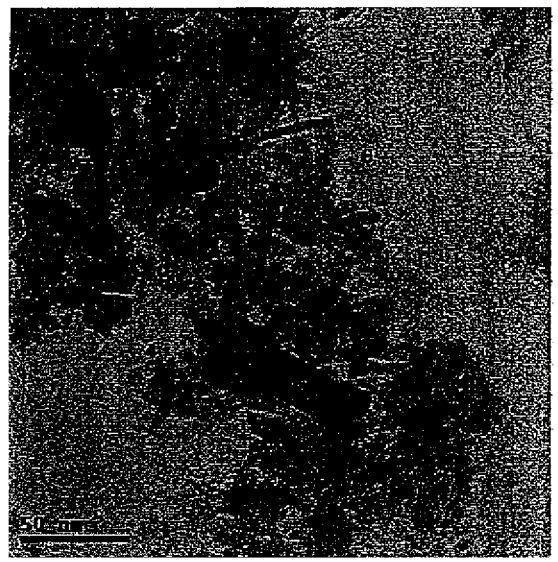
FIG. 5 is a transmission electron microscope (TEM) photograph of a surface of the support of the exhaust gas purifying catalyst that was obtained in Comparative Example 3.
Figure 6:
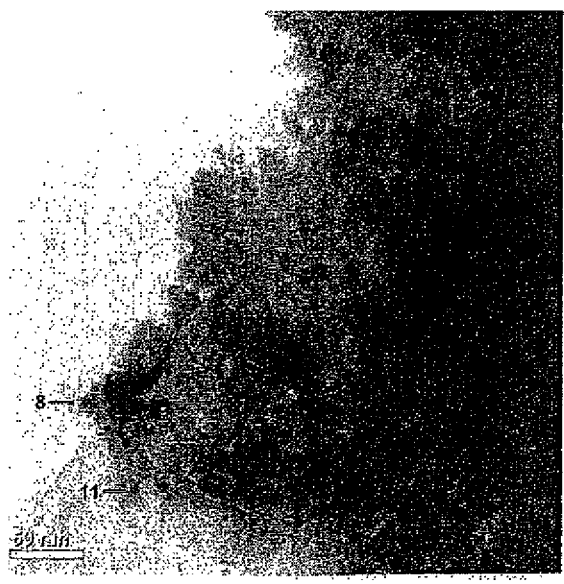
FIG. 6 is a transmission electron microscope (TEM) photograph of a surface of the support of the exhaust gas purifying catalyst that was obtained in Comparative Example 4.
Figure 7:
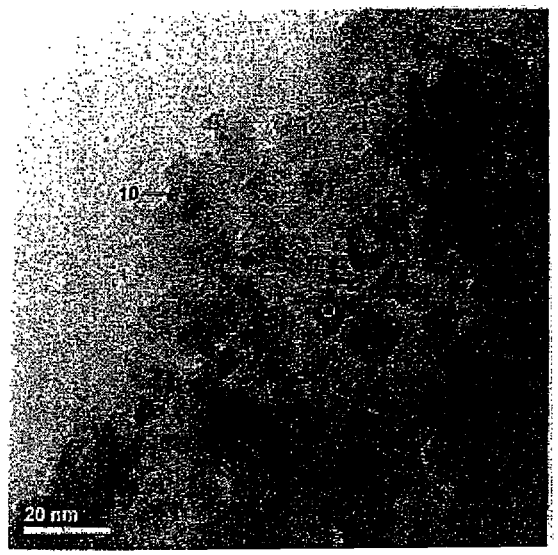
FIG. 7 is a transmission electron microscope (TEM) photograph of a surface of the support of the exhaust gas purifying catalyst that was obtained in Comparative Example 4.

Transmission electron microscope (TEM) photographs that were obtained during the above measurements are shown in FIGS. 1 and 2 (Example 1), FIGS. 3 and 4 (Example 2), FIG. 5 (Comparative Example 3) and FIGS. 6 and 7 (Comparative Example 4). The circles (○) in FIGS. 1 to 7 indicate the measurement points for EDX analysis. The percentage of the measurement points where a composite part that satisfies the condition that the Ag content is 0.5 to 10 mol % and the Ti content is 0.3 mol % or greater as a result of the TEM-EDX analysis is shown in Table 2. The averages of the Ag and Ti contents at the measurement points are also shown in Table 2.

TABLE 2

| | Average Ag concentration (mol %) | Average Ti concentration (mol %) | Abundance ratio of composite parts to all the measurement points (%) |
|---|---|---|---|
| Example 1 | 1.51 | 3.34 | 100 |
| Example 2 | 3.20 | 4.38 | 100 |
| Comparative Example 3 | 0.12 | 0 | 0 |
| Comparative Example 4 | 3.07 | 0.3 | 43 |

From the results that are shown in Table 2, it was confirmed that the composite part is present in 70% or more of all the measurement points on a surface of alumina in the exhaust gas purifying catalysts that were obtained Examples 1 and 2. As described above, it was confirmed that, in the exhaust gas purifying catalysts according to this embodiment that were obtained in Examples 1 and 2, the composite parts where Ag and Ti are present in a compounded state at a minute level in the order of nanometers or less are present at the above rate in the vicinity of the surfaces of the support except in areas where Ag particles with a diameter over 1 nm are deposited. Also, from TEM photographs that are shown in. FIGS. 1 to 4, the presence of Ag particles with a particle size over 1 nm was confirmed in the exhaust gas purifying catalysts that were obtained in Examples 1 and 2. On the contrary, in the catalyst that was obtained in Comparative Example 3, only Ag particles were observed. Also, it was observed that, in the catalyst that was obtained in Comparative Example 4, there are areas where a composite part is formed on the alumina but the abundance ratio of the composite parts is less than 43% of all the measurement points.

Using the exhaust gas purifying catalysts that were obtained in Examples 1 and 2 and the catalysts for comparison that were obtained in Comparative Examples 1, 2, 4 and 5, the following endurance test was conducted. A lean gas and a rich gas as shown in Table 3 below was contacted with each catalyst for 5 hours in a lean/rich cycle of 110 seconds/10 seconds at a temperature of 750° C. and a flow rate of 11 L/min. THC in Table 3 represents $C_3H_6$.

Using the exhaust gas purifying catalysts that were obtained in Examples 1 to 2 and the catalysts for comparison that were obtained in Comparative Examples 1, 2, 4 and 5 and subjected to the above endurance test, the following sulfur poisoning desorption test was conducted. First, sulfur was deposited on each catalyst by allowing $SO_2$ to flow through each catalyst at such a rate that the amount of sulfur (S) deposit per two liters of the volume of the catalyst would be 3 g. Then, a rich gas that was composed of $O_2$ (0.1% by volume), $CO_2$ (10% by volume), $C_3H_6$ (0.2% by volume (in terms of C)), $H_2O$ (5% by volume) and $N_2$ (balance) was contacted with each catalyst after sulfur deposition at a flow rate of 30 L/min while the gas temperature was increased from an initial temperature of 150° C. to 650° C. at a rate of 20° C./min, and the SOx (SO and $SO_2$) concentration in the gas after the contact with the catalyst was measured to obtain the sulfur desorption temperature (temperature at which the concentration of desorbed sulfur has a local maximum value). The results are summarized in Table 5.

Using the exhaust gas purifying catalysts that were obtained in Examples 1 to 2 and subjected to the above sulfur poisoning test, the catalyst for comparison that were obtained in Comparative Examples 1, 2, 4 and 5 and subjected to the above sulfur poisoning test, and the catalyst that was obtained in Comparative Example 3 and in the initial state, the following catalytic activity evaluation test was conducted. First, as a pretreatment, a pretreatment gas as shown in Table 4 was contacted with each catalyst for five minutes at a temperature of 400° C. and a flow rate of 30 L/min. Then, a test gas as shown in Table 4 was contacted with each catalyst after the pretreatment for 10 minutes at a temperature of 150° C. and a flow rate of 30 L/min, and the NOx adsorption amount per liter of the catalyst was measured. The NOx adsorption amount was calculated from the difference between the NOx concentrations before and after the passage through the catalyst. The results are summarized in Table 5.

TABLE 3

| | Gas type | | | | | | | |
|---|---|---|---|---|---|---|---|---|
| | NO | $O_2$ | THC | CO | $H_2$ | $CO_2$ | $H_2O$ | $N_2$ |
| | | | | Unit | | | | |
| | % By volume | % By volume | % By volume in terms of C | % By volume | % By volume | % By volume | % By volume | — |
| Lean gas | 0.04 | 7 | 0.06 | 0.01 | 0 | 11 | 5 | Balance |
| Rich gas | 0.04 | 0 | 0.32 | 6 | 2 | 11 | 5 | Balance |

TABLE 4

| | GAS Type | | | | | | | | |
|---|---|---|---|---|---|---|---|---|---|
| | NO | NO$_2$ | O$_2$ | THC | CO | H$_2$ | CO$_2$ | H$_2$O | N$_2$ |
| | | | | | Unit | | | | |
| | ppm | ppm | % By volume | % By volume in terms of C | % By volume | % By volume | % By volume | % By volume | — |
| Pretreatment gas | 0 | 0 | 0 | 0 | 0.13 | 0.09 | 10 | 5 | Balance |
| Test gas | 70 | 30 | 10 | 0.05 | 0 | 0 | 10 | 5 | Balance |

TABLE 5

| | Nox adsorption amount (mg/L) | Sulfur desorption temperature (° C.) |
|---|---|---|
| Example 1 | 498 | 593 |
| Example 2 | 503 | 590 |
| Comparative Example 1 | 479 | 634 |
| Comparative Example 2 | 470 | 650 |
| Comparative Example 3 | 0 | — |
| Comparative Example 4 | 450 | 629 |
| Comparative Example 5 | 354 | 630 |

From the results that are shown in Table 5, it was confirmed that the exhaust gas purifying catalysts according to this embodiment (Examples 1 and 2) has a large value of NOx adsorption amount as compared with the catalysts for comparison (Comparative Examples 1 to 5) and can achieve a sufficiently high NOx removal capacity even under a low temperature condition of 150° C. It was also confirmed that the exhaust gas purifying catalysts according to this embodiment (Examples 1 and 2) have a sufficiently low sulfur desorption temperature.

Using the exhaust gas purifying catalyst that was obtained in Example 3 and the NOx storage and reduction catalyst that was obtained in Comparative Example 6, the following NOx purification activity test was conducted. First, a lean gas and a rich gas as shown in Table 6 below was contacted with each catalyst in a lean/rich cycle of 60 seconds/6 seconds at a temperature of 200° C. and a flow rate of 15 L/min until it reached a steady state, and then the amount of NOx (NO and NO$_2$) in the rich gas before the contact with the catalyst and the amount of NOx in the gas after the contact with the catalyst were measured to obtain the percentage of NOx that was removed by the catalyst (NOx conversion efficiency). The results are summarized in Table 7.

TABLE 6

| | GAS Type | | | | | |
|---|---|---|---|---|---|---|
| | NO | O$_2$ | THC | CO | H$_2$O | N$_2$ |
| | | | Unit | | | |
| | ppm | % By volume | % By volume in terms of C | % By volume | % By volume | — |
| Lean gas | 450 | 10 | 0.01 | 10 | 3 | Balance |
| Rich gas | 450 | 1 | 2 | 10 | 3 | Balance |

TABLE 7

| | NOx conversion efficiency % |
|---|---|
| Example 3 | 53 |
| Comparative Example 6 | 32 |

From the results that are shown in Table 7, it was confirmed that when the exhaust gas purifying catalyst of this embodiment that was obtained in Example 1 is used in combination (Example 3), it exhibits a sufficiently high NOx purification capacity as compared with the NOx storage and reduction catalyst that was obtained in Comparative Example 6.

The exhaust gas purifying catalyst according to the present invention is especially useful as a catalyst that is used to purify exhaust gas from an internal combustion engine of an automobile.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

The invention claimed is:

1. An exhaust gas purifying catalyst, comprising:
   a support that contains at least one element selected from the first group consisting of Al, Zr and Ce, at least one element selected from the second group consisting of Ag, Mn, Co, Cu and Fe, and Ti; and
   particles that are composed of a metal or oxide of at least one element selected from the third group consisting of Ag, Mn, Co, Cu and Fe and that are deposited on the support,
   wherein 70% or more of any plurality of measurement points with a diameter of 2 nm on a surface of the support are composed of a composite part that has a content of 0.5 to 10 mol % of the at least one element of the second group and has a content of 0.3 mol % or greater of Ti, and
   a size of the composite part is tens or ones of nanometers.

2. The exhaust gas purifying catalyst according to claim 1, wherein the number of the plurality of measurement points is 15 more.

3. The exhaust gas purifying catalyst according to claim 1, wherein the composite part has a content of 1 to 7 mol % of the at least one element selected from the second group and a content of 1 to 50 mol % of Ti.

4. The exhaust gas purifying catalyst according to claim 1, wherein 80% or more of the any plurality of measurement points are composed of the composite part.

5. The exhaust gas purifying catalyst according to claim 1, wherein the at least one element that is selected from the second group is Ag.

6. The exhaust gas purifying catalyst according to claim 1, wherein the at least one element that is selected from the third group is Ag.

7. The exhaust gas purifying catalyst according to claim 1, wherein the at least one element that is selected from the first group is in the form of an oxide thereof.

8. The exhaust gas purifying catalyst according to claim 1, wherein content rates of the at least one element that is selected from the second group and the Ti, which the composite part has, are measured by analyzing the plurality of measurement points by transmission electron microscopy-energy dispersive X-ray spectrometry.

9. The exhaust gas purifying catalyst according to claim 1, wherein the content rate of the at least one element that is selected from the first group is 30 to 95% by mass based on the total mass of the exhaust gas purifying catalyst.

10. The exhaust gas purifying catalyst according to claim 1, wherein the content rate of the at least one element that is selected from the second group is 5 to 50% by mass based on the total mass of the exhaust gas purifying catalyst.

11. The exhaust gas purifying catalyst according to claim 1, wherein the content rate of Ti that constitutes the support is 1 to 50% by mass based on the total mass of the exhaust gas purifying catalyst.

12. The exhaust gas purifying catalyst according to claim 1, wherein the at least one element that is selected from the first group is Al; the at least one element that is selected from the second group is Ag; and the at least one element that is selected from the third group is Ag.

13. The exhaust gas purifying catalyst according to claim 1, wherein a size of the composite part is ones of nanometers.

* * * * *